(12) United States Patent
Nakamura et al.

(10) Patent No.: US 10,836,294 B1
(45) Date of Patent: Nov. 17, 2020

(54) UTILITY VEHICLE

(71) Applicant: KAWASAKI JUKOGYO KABUSHIKI KAISHA, Hyogo (JP)

(72) Inventors: Kenta Nakamura, Kakogawa (JP); Naoki Hashimoto, Kakogawa (JP); Masato Kinoshita, Hyogo (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 68 days.

(21) Appl. No.: 16/395,429

(22) Filed: Apr. 26, 2019

(51) Int. Cl.
*B60N 3/10* (2006.01)
*B60J 5/04* (2006.01)

(52) U.S. Cl.
CPC ............ *B60N 3/101* (2013.01); *B60J 5/0481* (2013.01); *B60J 5/0487* (2013.01)

(58) Field of Classification Search
CPC .......... B60N 3/101; B60N 3/18; B60J 5/0487; B60J 5/0481
USPC .................................................. 296/146.16
See application file for complete search history.

(56) References Cited

U.S. PATENT DOCUMENTS

| | | | |
|---|---|---|---|
| 2011/0132678 A1* | 6/2011 | Nakamura ............ | B62D 25/10 180/68.3 |
| 2013/0319785 A1* | 12/2013 | Spindler .............. | B62D 23/005 180/292 |
| 2014/0265285 A1* | 9/2014 | Erspamer ................. | B60N 2/68 280/783 |
| 2015/0022994 A1* | 1/2015 | Bingle ................... | G01D 13/20 362/23.01 |
| 2016/0185192 A1 | 6/2016 | Yamamoto et al. | |
| 2018/0251058 A1* | 9/2018 | Dalton .................. | F25D 31/007 |

\* cited by examiner

*Primary Examiner* — Pinel E Romain
(74) *Attorney, Agent, or Firm* — Wenderoth, Lind & Ponack, L.L.P.

(57) ABSTRACT

The utility vehicle has a door. The door includes a pipe frame, a door panel made of a resin material and attached to the pipe frame so as to cover the pipe frame, and a drink holder made of a resin material and is fixed to the door panel at one portion of the drink holder and fixed to the pipe frame at another portion of the drink holder. The door panel and the drink holder are integrated as one piece.

5 Claims, 5 Drawing Sheets

UTILITY VEHICLE

BACKGROUND OF THE INVENTION

1. Technical Field

The present invention relates to a utility vehicle.

2. Description of Related Art

Some utility vehicles are provided with doors as standard equipment or optionally, as described, for example, in US patent application Ser. No. 2016/0185192.

However, in the case of a door of the utility vehicle described in the above-mentioned publication, a drink bottle for holding a drink bottle, such as a plastic bottle, is not provided. Some users may want a door with a drink holder.

SUMMARY

Therefore, an object of the present invention is to provide a drink holder to a door of a utility vehicle.

In order to achieve the object described above, according to one aspect of the present invention, a utility vehicle includes a door. The door includes: a pipe frame; a door panel made of a resin material, and attached to the pipe frame so as to cover the pipe frame; and a drink holder made of a resin material, and fixed to the door panel at one portion of the drink holder and fixed to the pipe frame at another portion of the drink holder. The door panel and the drink holder are integrated as one piece.

According to such an aspect, a drink holder can be provided to a door of a utility vehicle.

DETAILED DESCRIPTION

Figure 1:
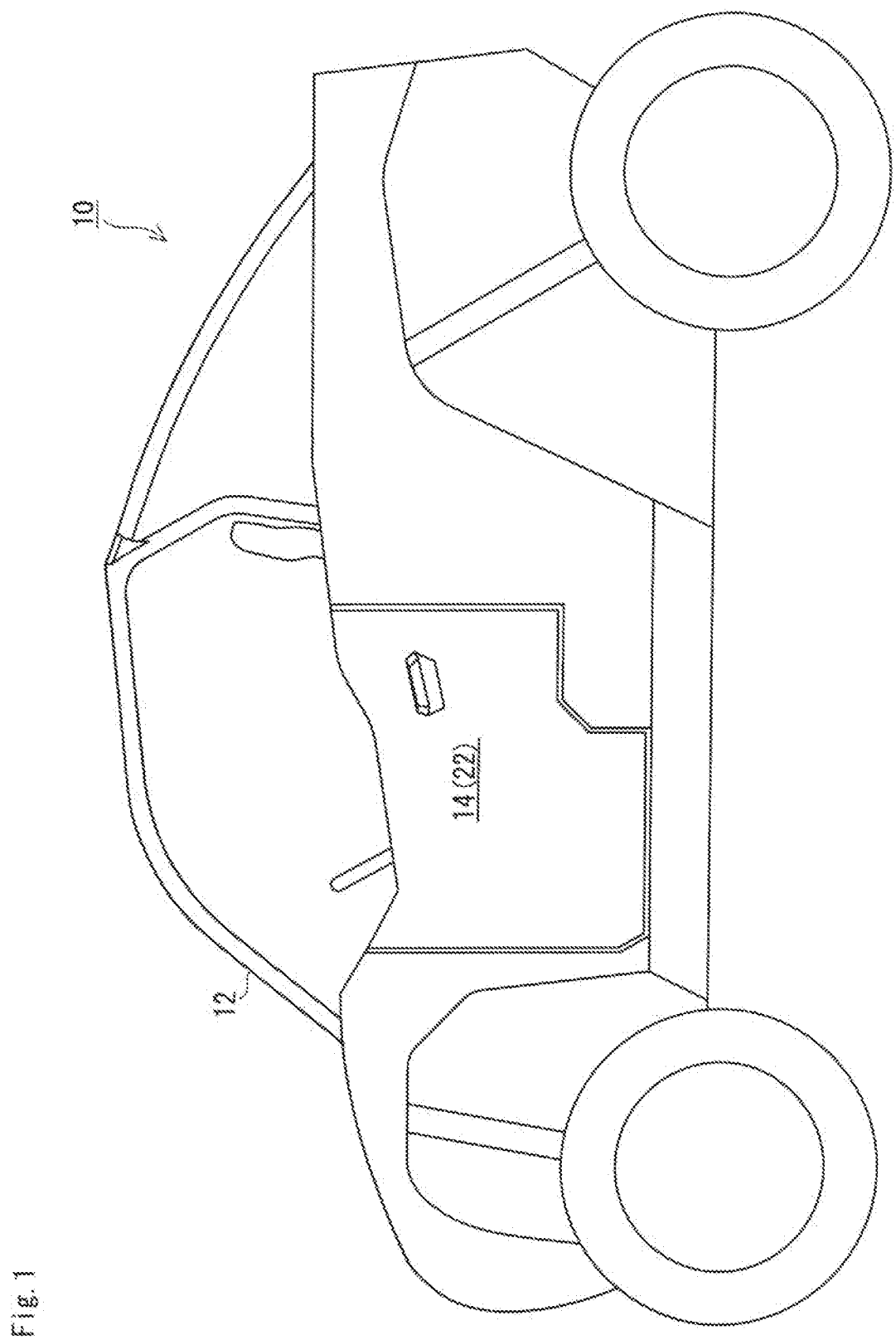
FIG. 1 is a side view of a utility vehicle according to one aspect of the present invention.

One aspect of the present invention is a utility vehicle having a door. The door includes a pipe frame, a door panel made of a resin material and attached to the pipe frame so as to cover the pipe frame, and a drink holder made of a resin material and fixed to the door panel at one portion of the drink holder and fixed to the pipe frame at another portion of the drink holder. The door panel and the drink holder are integrated as one piece.

According to such an aspect, a drink holder can be provided to a door of a utility vehicle.

For example, the door panel covers the pipe frame in a state where a portion of the pipe frame is exposed, and a drink holder is disposed between the door panel and the exposed portion of the pipe frame, and is fixed to the exposed portion.

For example, the door panel includes an inner panel disposed inside the vehicle and covers a portion of the pipe frame, and an outer panel disposed outside the vehicle and covers the entire pipe frame. The inner panel and the drink holder are integrated as one piece.

For example, the drink holder includes at least one U-shaped portion opened to one side in the thickness direction of the inner panel, and at least one U-shaped portion opened to the other side in the thickness direction. The U-shaped portions are aligned in the drink bottle in-out direction.

For example, the exposed portion of the pipe frame is provided with a door grip to be gripped by an occupant.

Hereinafter, more detailed embodiments will be described with reference to FIGS. 1 to 5. FIGS. 1 to 5 show a utility vehicle according to an embodiment.

Note that unnecessarily detailed description may be omitted. In addition, in the drawings, parts not related to the invention may be omitted so as not to be complicated. For example, detailed description of already well-known matters and redundant description on substantially the same configuration may be omitted. This is to avoid unnecessary redundancy of the following description and to facilitate understanding by those skilled in the art.

It should be noted that the inventors of the present invention provide the accompanying drawings and the following description to enable those skilled in the art to sufficiently understand the present disclosure. They are not intended to limit the subject matter recited in the claims.

In addition, the terms "front", "rear", "left" and "right" as used herein refer to a driver who operates on a utility vehicle.

As shown in FIG. 1, a utility vehicle 10 according to one embodiment includes a rollover protective structure (ROPS) 12 for protecting occupants and doors 14 attached to the ROPS 12. In FIG. 1, only a left door 14 is shown.

Figure 2:
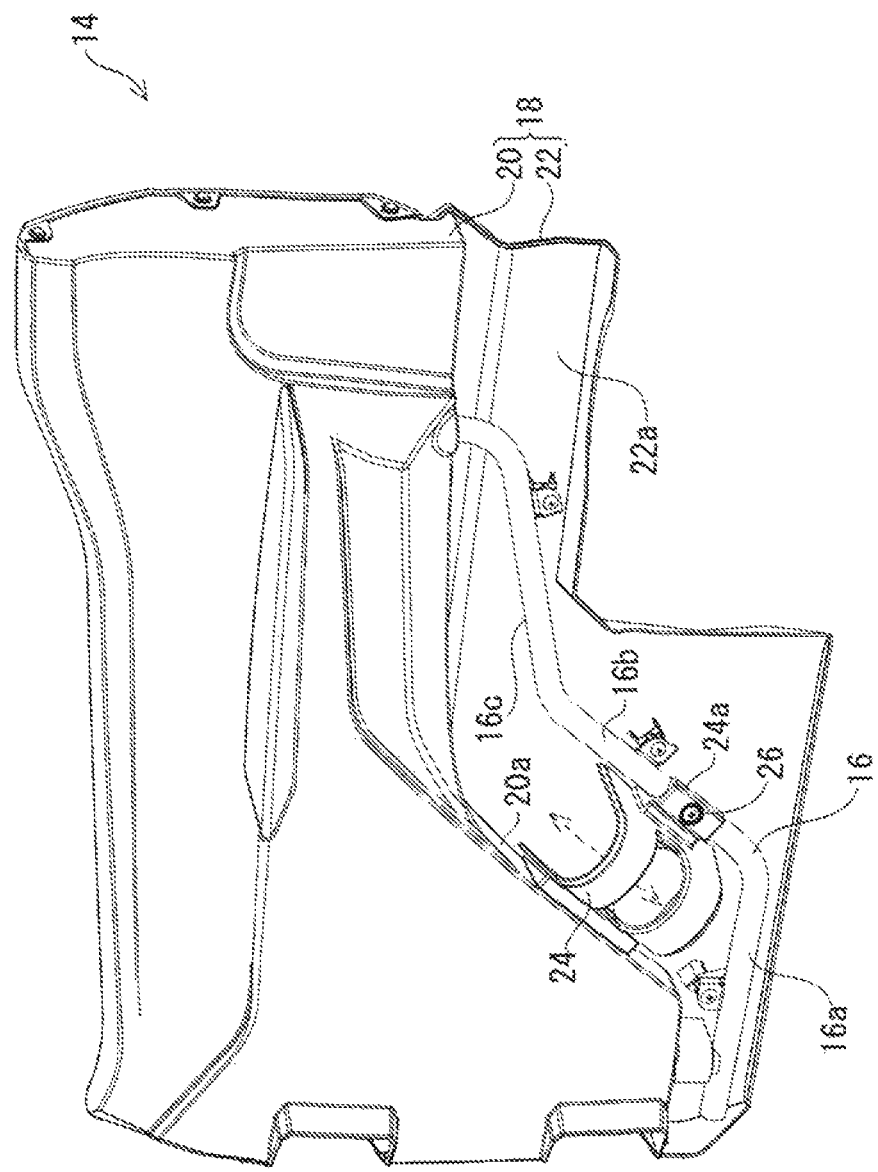
FIG. 2 is a perspective view showing a door as seen from the inside of the vehicle.

FIG. 2 is a perspective view showing the door as viewed from the inside of the vehicle.

As shown in FIG. 2, in the case of the present embodiment, the door 14 of the utility vehicle 10 is optionally and removably attached to the body of the utility vehicle.

As shown in FIG. 2, the door 14 has a pipe frame 16 made of a metal pipe, and a door panel 18 made of a resin material and attached to the pipe frame 16 so as to cover the pipe frame 16.

As shown in FIG. 2, in the case of the present embodiment, the door panel 18 includes an inner panel 20 disposed on the inner side of the vehicle and an outer panel 22 disposed on the outer side of the vehicle. The inner panel 20 and the outer panel 22 are attached to the pipe frame 16 such that the pipe frame 16 is disposed between the inner panel 20 and the outer panel 22. Each of the inner panel 20 and the outer panel 22 is a part made of a resin material and molded by a mold.

As shown in FIG. 2, in the case of the present embodiment, a portion of the pipe frame 16, specifically, a lower rear portion of the pipe frame 16, is exposed from the door panel 18 (that is, between the inner panel 20 and the outer panel 22) to the inside of the vehicle. That is, the inner panel 20 covers a portion of the pipe frame 16, and the outer panel 22 covers the entire pipe frame 16. Therefore, a back side portion 22a of the outer panel 22 is exposed to the inside of the vehicle.

As shown in FIG. 2, in the case of the present embodiment, the portion of the pipe frame 16 exposed from the door panel 18 includes a lower frame portion 16a extending in the longitudinal direction of the vehicle, a first inclined frame portion 16b extending rearward from the rear end of the lower frame portion 16a and obliquely upward at a relatively large inclination angle (inclination angle with respect to the longitudinal direction of the vehicle), and a second inclined frame portion 16c extending rearward from the rear end of the first inclined frame portion 16b and obliquely upward at a relatively small inclination angle. Note that the second inclined frame portion 16c functions as a door grip to be gripped by an occupant during traveling of the utility vehicle 10, for example, during traveling on a rough road.

As shown in FIG. 2, in the case of the present embodiment, a drink holder 24 for holding a drink bottle such as a plastic bottle is disposed between the inner panel 20 and the first inclined frame portion 16b of the pipe frame 16. The drink holder 24 is integrally attached to the inner panel 20.

Figure 3:
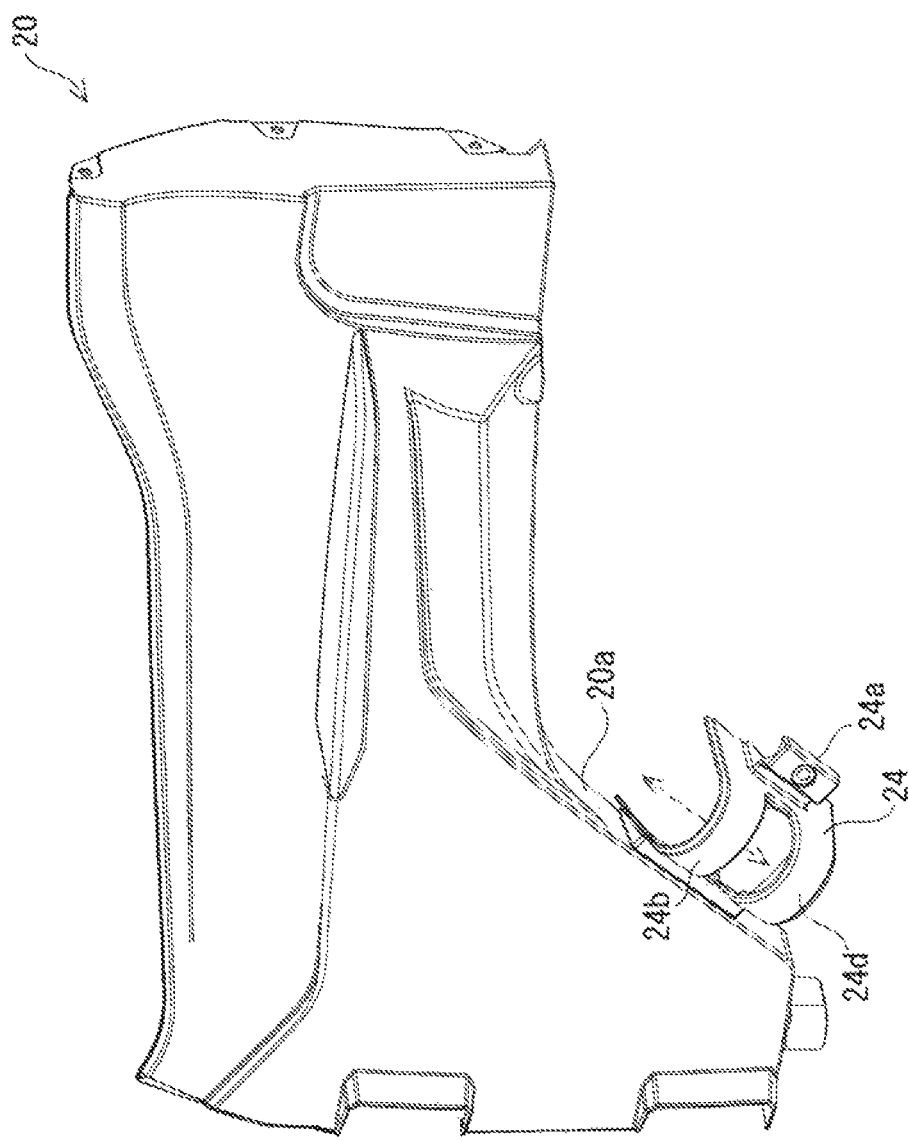
FIG. 3 is a perspective view showing the front side of an inner panel.
Figure 4:
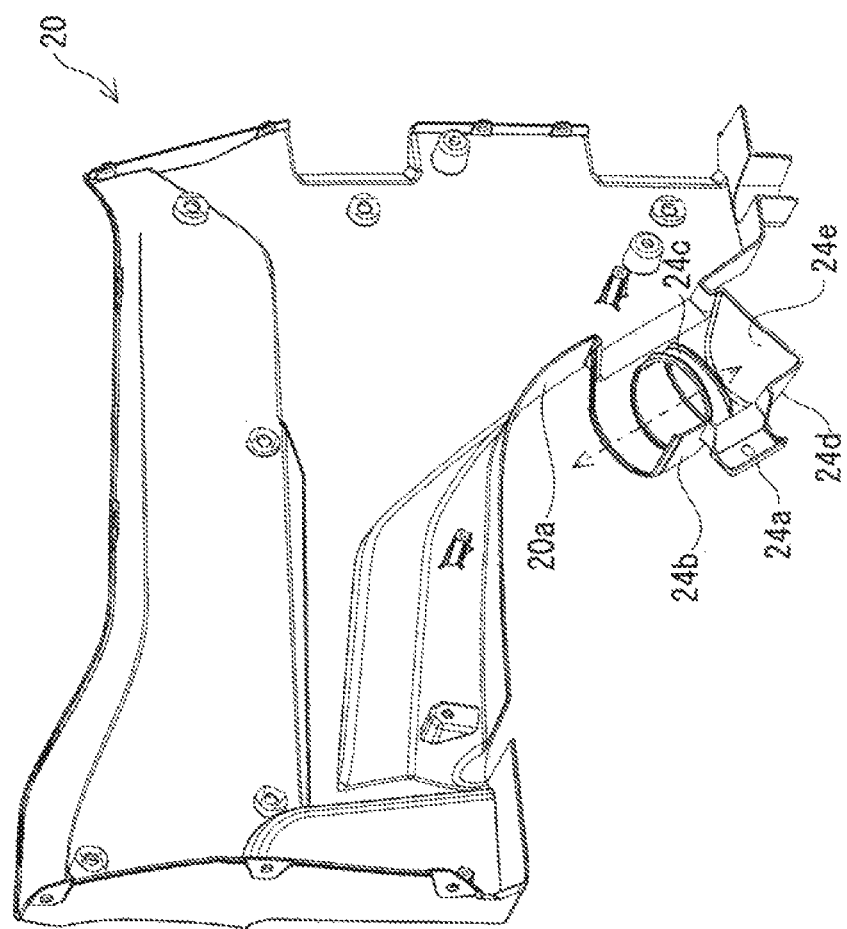
FIG. 4 is a perspective view showing the back side of the inner panel.

FIG. 3 is a perspective view showing the front side of the inner panel. FIG. 4 is a perspective view showing the back side of the inner panel.

As shown in FIGS. 3 and 4, the inner panel 20 and the drink holder 24 are integrated as one piece. That is, the drink holder 24 is made of the same resin material as that of the inner panel 20.

Specifically, the inner panel 20 is provided with an overhanging attachment surface 20a that extends substantially parallel to the first inclined frame portion 16b of the pipe frame 16. The drink holder 24 is integrally attached to the attachment surface 20a.

As shown in FIGS. 3 and 4, the drink holder 24 is attached to the attachment surface 20a of the inner panel 20 in a cantilever state. The drink holder 24 includes a bracket portion 24a on the opposite side of the attachment surface 20a. As shown in FIG. 2, the bracket portion 24a is to be fixed to the first inclined frame portion 16b of the pipe frame 16 by a screw 26. As a result, the drink holder 24 is disposed between the attachment surface 20a of the inner panel 20 and the first inclined frame portion 16b in the exposed portion of the pipe frame 16, and is fixed to the inner panel 20 at one portion and is fixed to the pipe frame 16 at another portion.

Since the drink holder 24 is disposed between the attachment surface 20a of the inner panel 20 and the first inclined frame portion 16b in the exposed portion of the pipe frame 16, the door 14 can be provided without causing the drink holder 24 to be largely protruded to the inside of of the vehicle. As a result, the drink holder 24 is prevented from being an obstacle for the occupant.

Moreover, as a portion of the drink holder 24 integrally attached to the inner panel 20 is fixed to the pipe frame 16, the attachment strength of the drink holder 24 on the door 14 is improved.

This will be described specifically. When the drink holder 24 is not fixed to the pipe frame 16 but fixed only to the inner panel 20, the drink holder 24 in a state of holding a drink bottle is likely to vibrate during traveling of the utility vehicle 10, especially during traveling on a rough road. Moreover, since the inner panel 20 is also made of a resin material, it is easily deformed. Therefore, when the drink holder 24 is repeatedly vibrated, a crack may occur in the connection part between the inner panel 20 and the drink bolder 24, and the connection part may eventually be broken.

In order to suppress such vibration of the drink holder 24, a portion of the drink holder 24 integrally attached to the inner panel 20 is fixed to the pipe frame 16 having relatively high rigidity in the door 14 (that is, having higher rigidity compared with that of the inner panel 20). Thereby, vibration of the drink holder 24 can be suppressed during traveling of the utility vehicle 10. As a result, the attachment strength of the drink holder 24 to the door 14 can be improved.

As shown in FIGS. 3 and 4, the inner panel 20 and the drink holder 24 are integrated as one piece. In the case of the present embodiment, the inner panel 20 and the drink holder 24 are simultaneously and integrally manufactured by molding the resin material with a mold, that is, manufactured in one process.

In the case of the present embodiment, the drink holder 24 has a shape suitable for molding in order to be molded by a mold together with the inner panel 20. Specifically, the drink holder 24 has a shape to be produced by the simplest mold, that is, only by a male mold and a female mold. The shape of the drink holder 24 will be specifically described.

Figure 5:
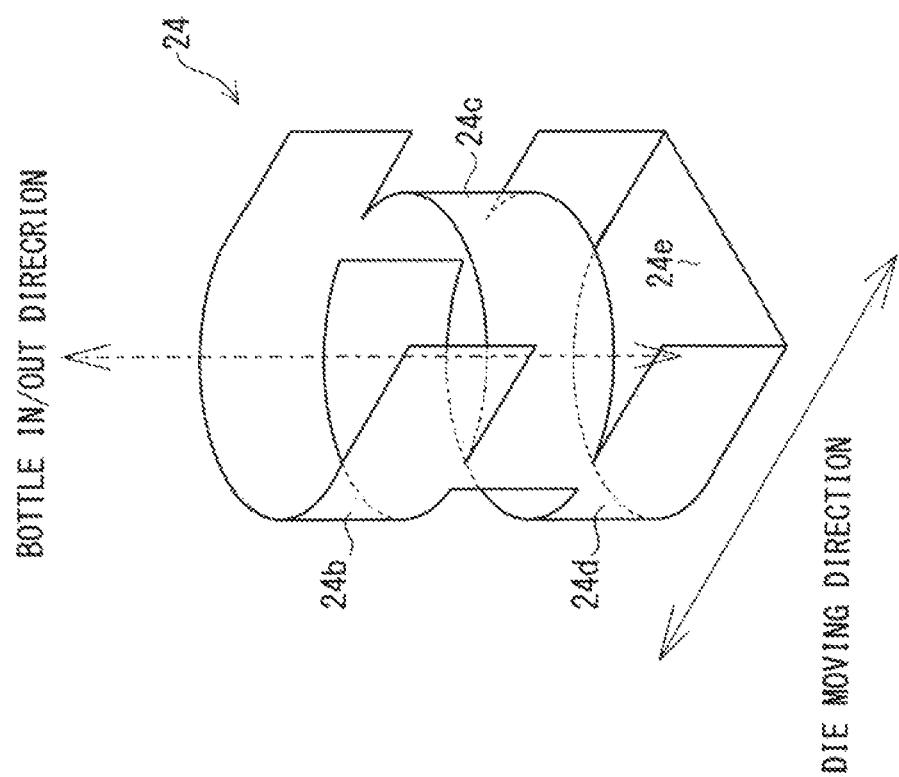
FIG. 5 is a perspective view conceptually showing the shape of a drink holder.

FIG. 5 is a perspective view conceptually showing the shape of the drink holder.

As schematically shown in FIG. 5, in the case of the present embodiment, the drink holder 24 is not in a cylindrical shape but in a shape having a first U-shaped portion 24b, a second U-shaped portion 24c, a third U-shaped portion 24d, and a bottom portion 24e.

Specifically, each of the first to third U-shaped portions 24b to 24d substantially has a U shape. In addition, the first U-shaped portion 24b, the second U-shaped portion 24c, and the third U-shaped portion 24d are arranged and connected in this order in the drink bottle in-out direction.

Furthermore, the first U-shaped portion 24b and the third U-shaped portion 24d are provided in a state of being opened to one side in the die moving direction, and the second U-shaped portion 24c located between them is provided in a state of being opened to the other side in the die moving direction. The die moving direction is the thickness direction of the inner panel 20, and is the moving direction of at least one of a male mold and a female mold when the inner panel 20 is molded.

Furthermore, the third U-shaped portion 24d at the lowest position is provided with the bottom portion 24e for receiving a drink bottle.

Such a drink holder 24 can hold a drink bottle, and can be molded by the simplest mold, that is, only by a male mold and a female mold. Moreover, it can be molded integrally and simultaneously with the inner panel 20. On the contrary, in the case of a drink holder having a cylindrically shape, in addition to a male mode and a female mold, another mold is needed to mold and slide the inside of the cylinder.

According to the present embodiment as described above, a drink holder can be provided to the door of a utility vehicle.

Although the present invention has been described with reference to the above embodiment, embodiments of the present invention are not limited thereto.

As described above, the embodiment has been described as an example of the technology of the present invention. To that end, the accompanying drawings and the detailed description are provided. Accordingly, some of the constituent elements described in the accompanying drawings and the detailed description include not only essential constituent elements for solving the problem. Constituent elements not essential for solving the problem may also be included. For this reason, it should not be instantly recognized that these non-essential components are imperative as these non-essential components are described in the accompanying drawings and the detailed description.

Further, since the above-described embodiment is provided to illustrate the technique of the present invention, various modifications, replacements, additions, omissions, and the like can be made within the scope of the claims or their equivalents.

The invention claimed is:

1. A utility vehicle comprising a door, wherein the door includes:
   a pipe frame;
   a door panel made of a resin material, the door panel being attached to the pipe frame so as to cover the pipe frame; and
   a drink holder made of a resin material, the drink holder being fixed to the door panel at one portion of the drink holder and fixed to the pipe frame at another portion of the drink holder, and
   the door panel and the drink holder are integrated as one piece.

2. The utility vehicle according to claim 1, wherein the door panel covers the pipe frame in a state where a portion of the pipe frame is exposed, and
   the drink holder is disposed between the door panel and an exposed portion of the pipe frame, and is fixed to the exposed portion.

3. The utility vehicle according to claim 2, wherein the door panel includes an inner panel disposed on an inner side of the utility vehicle to cover a portion of the pipe frame, and an outer panel disposed on an outer side of the utility vehicle to cover an entire pipe frame, and
   the inner panel and the drink holder are integrated as one piece.

4. The utility vehicle according to claim 3, wherein the drink holder includes at least one U-shaped portion opened to one side in a thickness direction of the inner panel, and at least one U-shaped portion opened to another side in the thickness direction, and the U-shaped portions are aligned in a drink bottle in-out direction.

5. The utility vehicle according to claim 2, wherein the exposed portion of the pipe frame has a door grip to be gripped by an occupant.

* * * * *